United States Patent [19]

Barlage et al.

[11] Patent Number: 5,069,295
[45] Date of Patent: Dec. 3, 1991

[54] SOIL CULTIVATING MACHINE

[75] Inventors: Bruno Barlage; Franz-Josef Robert, both of Hörstel, Fed. Rep. of Germany

[73] Assignee: H. Niemeyer Söhne GmbH & Co. KG, Hörstel, Fed. Rep. of Germany

[21] Appl. No.: 506,980

[22] Filed: Apr. 9, 1990

[30] Foreign Application Priority Data

Apr. 21, 1989 [DE] Fed. Rep. of Germany ... 8905025[U]

[51] Int. Cl.⁵ ............................................. A01B 33/14
[52] U.S. Cl. ................................ 172/123; 172/554; 172/548; 172/540; 172/753
[58] Field of Search ............... 172/540, 544, 548, 554, 172/753, 749, 754, 750, 123, 719, 751; 299/91; 37/142 R, 142 A, 141 T, 141 R

[56] References Cited

U.S. PATENT DOCUMENTS

| 289,797 | 12/1883 | Ball | 172/719 |
| 885,019 | 4/1908 | Connley | 172/753 |
| 1,586,151 | 5/1926 | Hess | 299/91 X |
| 2,515,268 | 7/1950 | Seaman | 172/548 X |
| 2,778,291 | 1/1957 | Kerns | 172/554 |
| 3,589,452 | 6/1971 | Haker | 172/548 |
| 3,702,638 | 11/1972 | Takata | 172/540 |
| 4,098,013 | 7/1978 | Hemphill | 172/719 |

Primary Examiner—Danton D. DeMille
Attorney, Agent, or Firm—Jordan and Hamburg

[57] ABSTRACT

A cultivating tool for a soil cultivating machine includes a holder adapted to be mounted on a rotatable shaft and having a generally U-shaped channel receiving a working implement. A pin is disposed in the channel, and the implement has a hook which receives the pin. Cooperable retainers in the channel and on the implement are cooperable for retaining the implement in the channel, the implement being mountable on the holder by hooking the hook on the pin and effecting engagement between the retainers, the implement being demountable from the holder by disengaging the retainers from the implement and unhooking the hook from the pin.

20 Claims, 2 Drawing Sheets

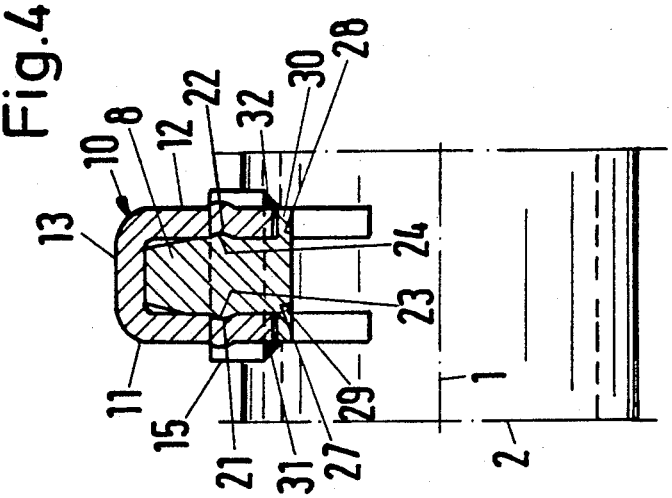
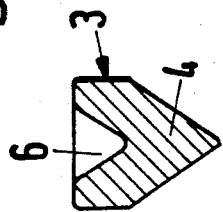
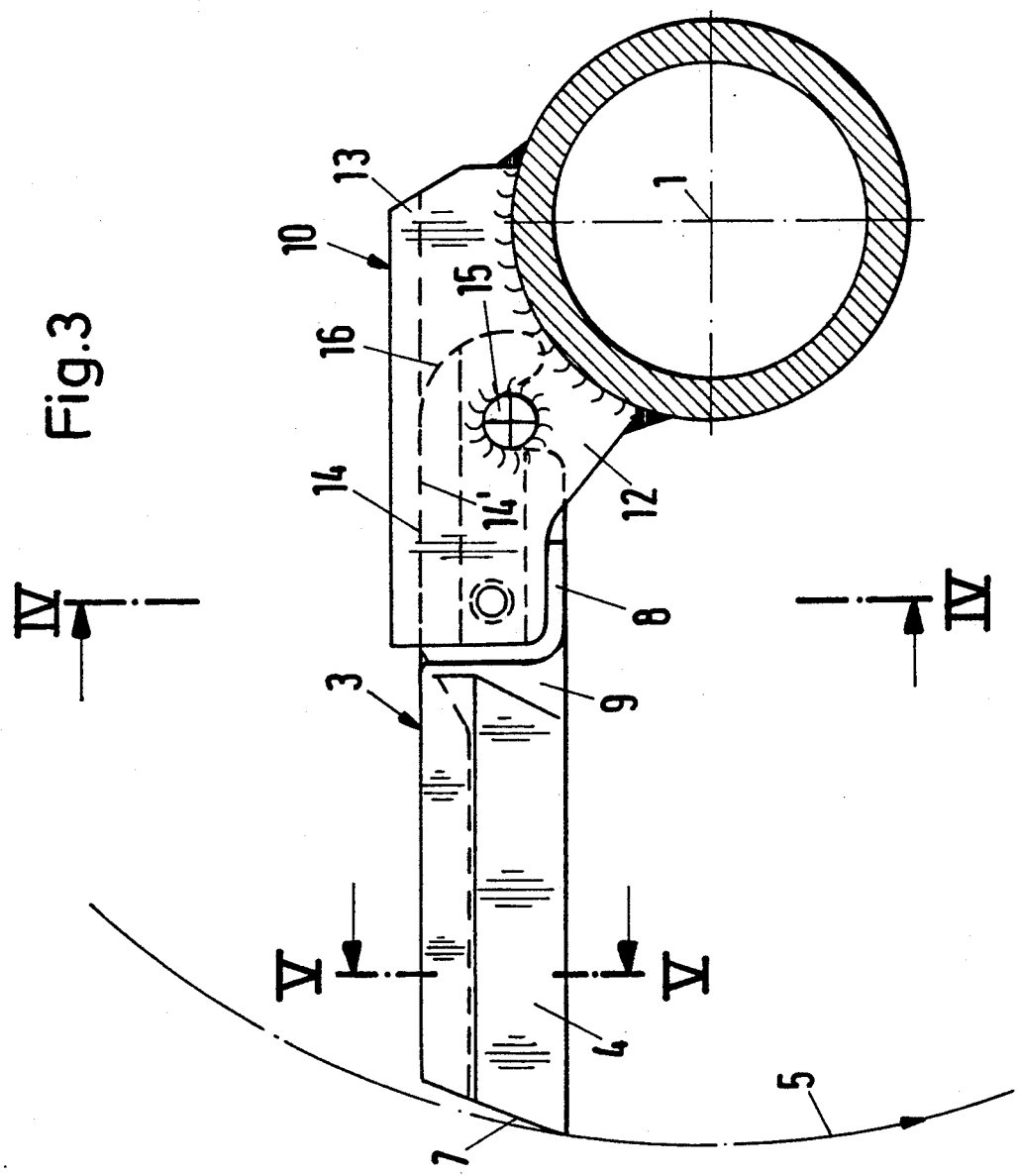

SOIL CULTIVATING MACHINE

BACKGROUND OF THE INVENTION

The invention relates to a soil cultivating machine.

In known machines of this type (European Publications 0 152 892, 0 293 675, German Utility Patent 87 07 829), the holding parts consist of panels, to which the implements are fixed with their attachment part by means of separate connecting elements. In this connection, the connecting elements may be formed by screws and/or by a connecting bolt defining a predetermined breaking point. In a further, known machine (German Utility Patent 85 32 161), the holding part of the holding arm is constructed with a receiving socket, in which the cylindrically constructed connecting part is accommodated. At its front end that is averted from the working part of the implement, the connecting part is provided with a coaxial threaded stem, which reaches through a borehole at the rear end of the receiving socket and serves to fix the implement by means of an exterior adjusting nut. In all of the embodiments, the attachment of the implements requires separate connecting parts, which must be attached by means of auxiliary implements.

SUMMARY OF THE INVENTION

It is an object of the invention to provide a soil cultivating machine with an implement attachment, which enables implements to be connected and disconnected easily without the use of auxiliary implements and, at the same time, brings about that the implements are held securely at their holding parts.

In the case of the inventive soil cultivating machine, the implement, in general an essentially straight, extended prong is simply introduced with its attachment part into the pocket, placed with its hook on the cross pin in the pocket and transferred by a swivelling motion into the operating position in which the implement is fixed by a drop-in locking mechanism. To remove the implement, the latter is swivelled back and unhinged. A heavy blow, for which no special auxiliary tool is required, is sufficient to overcome the drop-in locking mechanism.

Further details and advantages arise out of the following description and the drawing, in which two examples of the operation of the object of the invention are illustrated in greater detail.

BRIEF DESCRIPTION OF THE DRAWING

FIG. 3 shows an elevation similar to that of FIG. 1 of a second embodiment of the blade attachment of a soil cultivating machine of the invention.

FIG. 4 shows a section along the line IV—IV in FIG. 3.

FIG. 5 shows a section along the line V—V of FIG. 3.

DESCRIPTION OF THE PREFERRED EMBODIMENT

Figure 2:
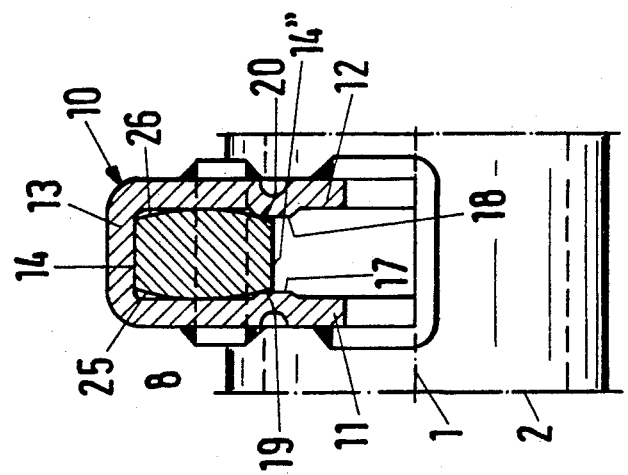
FIG. 2 shows a section along the line II—II of FIG. 1.

The soil cultivating machine, illustrated in the drawing with only the parts essential for the present invention, comprises in detail a shaft 2, which is driven in soil cultivating operations, supported on a machine frame that is not shown in such a manner that it can rotate about an axis 1 and equipped usually with a plurality of implements 3, of which only one is illustrated in greater detail. The construction of the implements 3, their orientation with respect to the shaft 2 as well as the number and distribution of the implements on the shaft depend on the nature of the soil cultivation and are known in various embodiments. As shown, the implements 3 have, for example, the shape of an extended, essentially straight prong or the shape of mulching knives or cutters or shapes suitable for other work such as chopping or hacking.

In the case of the straight prong that is shown as tool 3, the working part 4 is formed wedge-shaped on the side pointing in the direction of rotation 5, is provided with a longitudinal recess 6 on its back side and is constructed at its free end with an angular cut 7, by means of which a type of free-cutting angle is formed. The working part 4 goes over into an attachment part 8 and the transition region 9 can, if required, be constructed as a predetermined breaking point, if an overload safety device for the individual implements is desired in addition to or instead of an overload safety device for the shaft 2.

For attaching the implement 3 to the shaft 2, the latter is provided with a separate holding part 10 per implement 3, which is constructed as an essentially U-shaped pocket, which is welded to the shaft 2 at the end regions of its side legs 11, 12 and accommodates the attachment part 8 of the implement 3. The cross leg 13 of the U-shaped pocket 10 offers on the inside a stop face 14, which, in contact with an abutment surface 14' at the attachment part 8 of the implement 3, defines the operating position of the latter. The pocket 10 comprises a cross pin 15, which reaches through the side legs 11, 12 of the pocket 10 and is welded to their outer sides.

The shaft-side end of the attachment part 8 of the implement 3 is constructed as a hook 16, which can be placed upon or suspended from the cross pin 15. In the operating position of the implement 3, this hook 16 embraces the cross pin 15 on the side averted from the shaft 2 with a reach-around angle of almost 180° and secures the implement against being shifted in its longitudinal direction. The hook 16 can be placed in an attachment position, which is illustrated by broken lines in FIG. 1, on the cross pin 15 and can also be removed from the cross pin 16 in this position. In the attachment position, the implement 3 has an orientation, which is tilted in advance of the shaft 2 in the operating direction of rotation 5 relative to the operating position illustrated by solid, continuous lines in FIGS. 1 and 3. The angle of tilt between the attachment and operating positions of the implement 3 can amount to about 30° to 60°.

Figure 1:
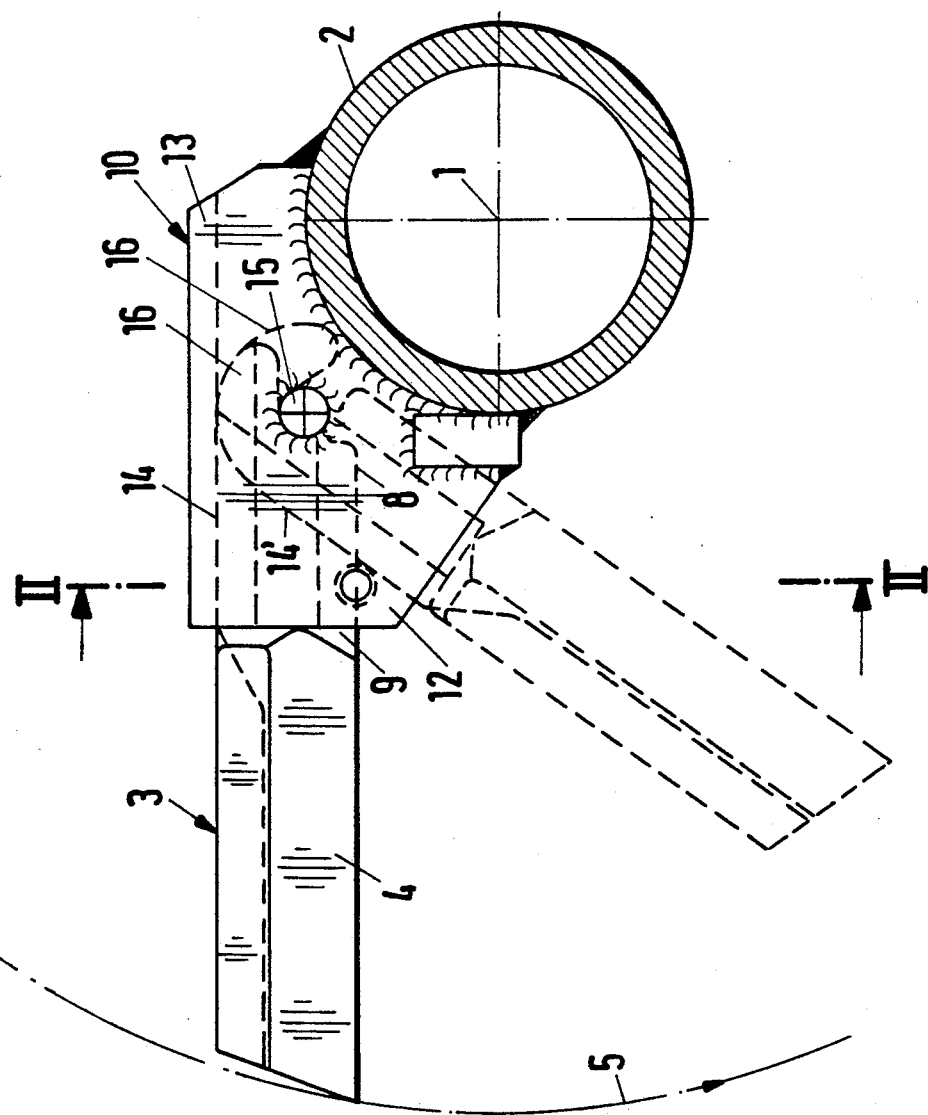
FIG. 1 shows a side elevation of a prong attachment of a soil cultivating machine of the invention, partially in section.

Between the side legs 11, 12 of the pocket 10 and the attachment part 8 of the implement 3, a drop-in locking mechanism is provided, which fixes the implement 3 in its operating position in conjunction with the other parts of the tool attachment that are engaged. In the construction of FIG. 1, the drop-in locking mechanism is formed by the drop-in cogs 17, 18, which project in a direction transverse to that of the implement 3, and the drop-in recesses 19, 20, which lie opposite to the drop-in cogs 17, 18 in the operating position of the implement 3 and retract in the transverse direction, and which are locked together in pairs in the operating position of the implement 3. The drop-in projections 17, 18 are disposed on the inside of the side legs 11, 12 of the pocket 10 facing the attachment part 8. In the example of FIG. 1, they are fashioned as beads formed by embossing. Instead of this, they may also be formed by integrally molded cogs, such as in the case of holding parts 10 of cast iron or by drop-in elements that have been attached, such as the ends of screw bolts, by rivet heads, etc., or also by boreholes. In the latter case, the possibility exists that they may be provided before the pocket 10 is welded to the shaft 2.

In the example of FIGS. 1 and 2, the drop-in projections 17, 18 engage drop-in recesses 19, 20, which are formed by sloping side face regions that run in the longitudinal direction of the implement 3 along front face 14″ of the attachment part 8, which is facing away from the abutment surface 14′. Instead of this preferred development of the drop-in recesses 19, 20, the drop-in recesses can also be formed by depressions adapted in outline to the drop-in projections. The development of the drop-in recesses 19, 20 shown has, however, the advantage that these recesses at the same time form running-up ramps, which function during the transfer of an implement 3 from the operating position into the attachment position and facilitate the overcoming of the drop-in locking mechanism. Such a facilitation is, however, also possible owing to the fact that the drop-in projections 17, 18 and/or the drop-in recesses 19, 20 in each case have sloping sides as running-up ramps which, for example in the case of drop-in recesses formed by beads by means of the embossing process, result practically automatically.

Contrary to the construction of the drop-in locking mechanism of the example of the operation of FIGS. 1 and 2, the drop-in locking mechanism of the example of the operation of FIGS. 3 and 4 is formed by drop-in recesses 21, 22 at the inside of the side legs 11, 12 of the pocket 10 and by drop-in projections 23, 24 at the side faces of the attachment part 8 of the implement 3. This has the advantage that, when the tool is replaced for reasons of general wear, the drop-in projections 23, 24 are also exchanged, so that the wear, which has occurred at the drop-in projections, is also eliminated.

In the area of the drop-in locking mechanism sites, the side legs 11, 12 of the pocket 10 advantageously are springy so that they can move out of the way and, in the drop-in locking position of the implement 3, preferably assume a clamping position, in which they are propped apart elastically, with the consequence that the projections and the recesses of the drop-in locking mechanism mutually engage one another under pretension in the operating position of the implement 3 and so avoid an undesirable tool slack. At the same time, an adjustment effect arises out of this pretension. This is favored particularly when, aside from the use of springy materials for the walls of the pocket 10, the drop-in locking mechanism sites have the greatest possible distance from the cross leg 13 of the pocket 10 and/or from the cross pin 15 disposed in the pocket 10, so that the largest possible spring excursion results. This is so for both constructions, namely those of FIGS. 1 and 2 and of FIGS. 3 and 4. With respect to the latter, it should be noted that the drop-in recesses 21, 22 are formed by almost circular depressions formed by embossing and that the drop-in projections are formed by cogs, which are integrally molded or, for example, forged to the side faces of the attachment part 8 of the implement 3 and the outline of which is adapted to the depressions.

In the example of the operation of FIGS. 1 and 2, the attachment part 8 of the implement 3 has in at least some areas sloping faces 25, 26, which adjoin the abutment surface 14′ and function as running-up ramps, when an implement is swivelled from its attachment position into the operating position and, in so doing, has to overcome the drop-in locking mechanism. In the case of the constructions of FIGS. 1 and 2, the drop-in recesses 19, 20 form the running-up ramps on the other side of the attachment part 8. However, in the construction of FIGS. 3 and 4, the attachment part 8 can be provided with sloping surfaces 27, 28, which serve merely as running-up ramps, at the site of the lock-in recesses 19, 20 of the construction of FIGS. 1 and 2.

At its two side faces facing the side legs 11, 12 of the pocket 10, the implement 3 is provided in the region of its attachment part 8 with rib-shaped protective projections 29, 30, which cover the, in the operating direction of rotation 5, front narrow sides 31, 32 of the side legs at least in that region, in which the possibility of engagement in the soil exists. The protective parts 29, 30, which extend along the narrow sides, prevent wear at the pockets 10. On the other hand, wear at the protective parts is of no consequence, since the implements 3 need to be changed anyhow from time to time because of other wear.

The pocket 10 is a dimensionally exceptionally stable component, which provides a firm seat for the attachment part 8 of the implement and can absorb high loads without deformation. In this pocket 10, the implement 3 essentially has a clearance-free seat, which it retains during all operating loads. To exchange an implement, a heavy blow on the back side, which is facing away from the direction of rotation 5, is sufficient to change it over to the attachment position. For such a blow, there is the new prong. On the other hand, the old prong can find use for a blow on an applied new prong, so that special auxiliary tools are dispensable.

What we claim is:

1. A cultivating tool for a soil cultivating machine comprising a holding means adapted to be mounted on a rotatable shaft, an implement having a mounting portion, said holding means having a generally U-shaped channel receiving said mounting portion of said implement, a pin in said channel, said mounting portion of said implement having a hook which receives said pin, cooperable retaining means in said channel and on said mounting portion of said implement which are cooperable for retaining said implement in said channel, said implement having a mounted position on said holding means in which said implement is operable to cultivate soil when said shaft is rotated in one direction, said hook engaging said pin and said retaining means being engaged when said implement is in said mounted position, said implement having a demounting position pivotably spaced from said mounted position, said hook being unhookable from said pin and being removeable from said holding means when said implement is in said demounting position, said implement being mountable on said holding means by hooking said hook on said pin and pivoting said implement to effect engagement of said retaining means in said channel and on said mounting portion of said implement, said implement being demountable from said holding means by pivoting said implement and disengaging said retaining means and subsequently unhooking said hook from said pin, said retaining means comprising two spaced side walls which form a part of said U-shaped channel, said U- shaped channel having a base wall from which said two spaced side walls extend, said mounting portion of said implement having spaced side walls extending from a transverse wall, said transverse wall engaging said base wall when said implement is in said mounted position, said spaced side walls of said U-shaped channel having spring properties which enable the spaced side walls to be temporarily sprung apart from one another to receive said mounting portion of said implement when said implement is being mounted and demounted on and from said holding means and which further biasingly clamps and retains said mounting portion in said channel when said implement is in said mounted position, said implement side walls having bevel portions which provide run-up ramps to facilitate movement of said implement as said implement is being mounted on said holding means.

2. A cultivating tool according to claim 1 wherein said implement has a longitudinal axis, said hook having a generally U-shaped configuration which receives said pin to preclude longitudinal movement of said implement in said channel.

3. A cultivating tool according to claim 1 wherein said mounted position is pivotably spaced from said demounting position by 30 to 60 degrees.

4. A cultivating tool according to claim 1 wherein said bevel portions extend from said transverse wall.

5. A cultivating tool according to claim 1 wherein said mounting portion of said implement has an opposite wall opposite said transverse wall, said retaining means comprising recesses in said implement side walls extending from said opposite wall.

6. A cultivating tool according to claim 1 wherein said retaining means comprises projections and recesses receiving said projections when said implement is in said mounted position.

7. A cultivating tool according to claim 6 wherein said projections are on said channel side walls and said recesses are in said implement side walls.

8. A cultivating tool according to claim 6 wherein said projections are on said implement side walls and said recesses are in said channel side walls.

9. A cultivating tool according to claim 6 wherein said implement has a longitudinal axis, said recesses comprising elongate grooves generally parallel to said longitudinal axis.

10. A cultivating tool according to claim 6 wherein said recesses are formed by transverse boreholes in said holding means.

11. A cultivating tool according to claim 1 wherein said implement has a working portion and an overload joining portion between said working portion and said mounting portion, said overload joining portion being weaker than said working portion and said mounting portion.

12. A cultivating tool according to claim 1 wherein said two side walls of said holding means have terminating ends, said mounting portion of said implement having transverse projections juxtaposed to said terminating ends when said implement is in said mounted position.

13. A cultivating tool for a soil cultivating machine comprising a holding means adapted to be mounted on a rotatable shaft, an implement having a mounting portion, said holding means having a generally U-shaped channel receiving said mounting portion of said implement, a pin in said channel, said mounting portion of said implement having a hook which receives said pin, said channel having a first pair of spaced side walls extending from a channel base wall, said mounting portion of said implement having a second pair of side walls juxtaposed to said first pair of side walls, said second pair of side walls extending from an implement transverse wall, one of said pair of side walls having projections and the other pair of said side walls having depressions at least partially engageable with said depressions, said projections and depressions constituting cooperable retaining means for retaining said implement in said channel when said projections engage said depressions, said implement having a mounted position on said holding means in which said implement is operable to cultivate soil when said shaft is rotated in one direction, said implement transverse wall engaging said channel base wall when said implement is in said mounted position, said hook engaging said pin and said retaining means being engaged when said implement is in said mounted position, said implement being mountable on said holding means in said mounted position by hooking said hook on said pin and effecting engagement of said retaining means, said implement being demountable from said holding means by disengaging said retaining means and unhooking said hook from said pin, one of said pair of side walls having bevel portions which provide run-up ramps to facilitate movement of said implement as said implement is being mounted on said holding means into said holding position.

14. A cultivating tool according to claim 13, wherein said U-shaped channel biasingly clamps said holding portion of said implement within said U-shaped channel when said implement is in said mounted position and said projections are engaged in said depressions.

15. A cultivating tool according to claim 13, wherein said projections are on said first pair of side walls, said projections on each of said first pair of side walls being spaced from one another a first distance, said second pair of side walls each having a side wall section spaced from one another a second distance, said first distance being less than said second distance, said side wall sections traversing the space between said projections when said implement is being mounted and demounted on and from said holding means.

16. A cultivating tool according to claim 15, wherein said U-shaped channel has spring characteristics such that said first pair of side walls temporarily move apart and the space between said projections temporarily increases as said side wall sections traverse the space between said projections when said implement is being mounted and demounted on and from said holding means.

17. A cultivating tool according to claim 16, wherein said U-shaped channel biasingly clamps said holding portion of said implement within said U-shaped channel when said implement is in said mounted position.

18. A cultivating tool according to claim 13, wherein said projections are on said second pair of side walls, said projections on each of said second pair of side walls being spaced from one another a first distance, said first pair of side walls each having a side wall section spaced from one another a second distance, said first distance being greater than said second distance, said projections traversing the space between said side wall sections when said implement is being mounted and demounted on and from said holding means.

19. A cultivating tool according to claim 18, wherein said U-shaped channel has springy characteristics such that said first pair of side walls temporarily move apart and the space between said side wall sections temporarily increases as said projections traverse the space between said side wall sections when said implement is being mounted and demounted on and from said holding means.

20. A cultivating tool according to claim 19, wherein said U-shaped channel biasingly clamps said holding portion of said implement within said U-shaped channel when said implement is in said mounted position.

* * * * *